United States Patent
Thalanany et al.

(10) Patent No.: US 12,308,922 B2
(45) Date of Patent: May 20, 2025

(54) REINFORCEMENT LEARNING MACHINE LEARNING-ASSISTED BEAM PAIR SELECTION FOR HANDOVER IN RADIO ACCESS NETWORKS

(71) Applicant: United States Cellular Corporation, Chicago, IL (US)

(72) Inventors: Sebastian Thalanany, Kildeer, IL (US); Narothum Saxena, Hoffman Estates, IL (US); Michael S. Irizarry, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 78 days.

(21) Appl. No.: 18/091,557

(22) Filed: Dec. 30, 2022

(65) Prior Publication Data
US 2024/0223256 A1 Jul. 4, 2024

(51) Int. Cl.
H04B 7/06 (2006.01)
H04W 72/044 (2023.01)
H04W 72/0457 (2023.01)
H04W 72/50 (2023.01)

(52) U.S. Cl.
CPC ...... *H04B 7/0639* (2013.01); *H04W 72/0457* (2023.01); *H04W 72/046* (2013.01); *H04W 72/535* (2023.01)

(58) Field of Classification Search
CPC ........... H04W 72/0457; H04W 72/046; H04W 72/535; H04W 36/32; H04B 7/0639; H04B 7/088; H04B 7/06952; H04B 7/0617; G06N 3/08
See application file for complete search history.

(56) References Cited

U.S. PATENT DOCUMENTS

| | | | | |
|---|---|---|---|---|
| 2020/0044909 | A1* | 2/2020 | Huang | G06N 7/01 |
| 2020/0366340 | A1* | 11/2020 | Zhang | H04L 5/0051 |
| 2021/0136653 | A1* | 5/2021 | Zhang | H04W 48/18 |
| 2021/0385907 | A1* | 12/2021 | Kobayashi | H04W 88/06 |

(Continued)

OTHER PUBLICATIONS

R1-2211000, "Evaluation on AI/ML for beam management", 3GPP TSG RAN WG1 #111, vivo, Toulouse, France, Nov. 14-18, 2022 (Year: 2022).*

(Continued)

*Primary Examiner* — Aristocratis Fotakis
(74) *Attorney, Agent, or Firm* — Leydig, Voit & Mayer, Ltd.

(57) ABSTRACT

A system and method carried out over a mobile wireless network are described for performing beam pair (BP) and end-to-end (E2E) network slice selection for supporting an invoked service on a mobile equipment (ME). The method includes establishing an initial BP with a radio access network (RAN) node, using an available link policy, enabling communicating a request to the RAN node including an indication of a desired service level for a service invoked on the ME. The method further includes updating, in accordance with the indication of a desired service level, a link policy and an E2E slice policy by performing a reinforcement learning, wherein the link policy is used to select a BP for the ME for a given ME mobility pattern, and wherein the E2E network slice policy is used to select an E2E network slice for the desired service level for the service invoked on the ME.

20 Claims, 7 Drawing Sheets

(56) References Cited

U.S. PATENT DOCUMENTS

| | | | |
|---|---|---|---|
| 2022/0179635 A1* | 6/2022 | Fang | G06N 3/045 |
| 2023/0155920 A1* | 5/2023 | Zhang | H04L 41/16 |
| | | | 709/238 |
| 2023/0345292 A1* | 10/2023 | Pateromichelakis | |
| | | | H04W 28/0268 |
| 2023/0422117 A1* | 12/2023 | Li | H04W 36/08 |
| 2024/0063885 A1* | 2/2024 | Ozkoc | H04B 7/088 |
| 2024/0114364 A1* | 4/2024 | Kumar | H04W 24/08 |
| 2024/0220701 A1* | 7/2024 | Kim | G06F 30/367 |
| 2024/0259879 A1* | 8/2024 | Ranganath | H04W 28/18 |

OTHER PUBLICATIONS

Janne Ali-Tolppa, Marton Kaj, Mobility and QoS Prediction for Dynamic Coverage Optimization, Nokia Bell Labs, Technical University of Munich, NOMS 2020—2020 IEEE/IFIP Network Operations and Management Symposium (Year: 2020).*

* cited by examiner $Q_{PS}$ Table
(Optimized E2E Slice Policies for Identified Slice Patterns – output of q-learning)

| Slice Pattern (SR – slice resource) | Optimized slice policy ($P_s$) |
|---|---|
| SR-1 | $Q_{SKR}1$ |
| SR-2 | $Q_{SKR}2$ |
| ... | ... |
| SR-U | $Q_{SKR}U$ |

$Q_{SKR}$ Table
(Each table defining a slice policy for a particular Slice Pattern in $Q_{PS}$ Table)

| SKQ (Slice KPI-based $Q_{SKR}$ table parameter | Slice KPI Reward (SKR) quality metric |
|---|---|
| Round-trip time (RTT) latency estimate | Qualification of the rank ordered BP entries in the CHO list with the RTT estimate |
| Other slice based KPI customizable to suit a particular slice | Qualifications of the rank ordered BP entries with other KPIs associated with a slice, in addition to the RTT estimates in the CHO list |
| Slice CHO list | Collection of maximum number of slice qualified BP candidates in a rank order listing of BP entries in a slice CHO list |

FIG. 5B

REINFORCEMENT LEARNING MACHINE LEARNING-ASSISTED BEAM PAIR SELECTION FOR HANDOVER IN RADIO ACCESS NETWORKS

FIELD OF THE INVENTION

The present disclosure generally relates to mobile wireless communications. More particularly, the present disclosure is directed to managing connections that are based upon beamformed wireless communication links between a radio access node of a mobile wireless network and a mobile wireless device.

BACKGROUND OF THE INVENTION

Relative to the previous generations of mobile connectivity and service, 5G mobile wireless network technology introduces a configurable multi-element antenna arrangement supporting beamforming and a variable beam numerology and directionality, which offers enhanced flexibility in terms of utilization of available wireless radio communication spectrum. On the other hand, supporting variable beam configuration introduces complexity in terms of uplink/downlink physical channel configuration including, for example, subcarrier spacing, bandwidth parts, and performance challenges.

Similarly, virtualization in 5G systems offers more flexibility over shared resources, which are decentralized and distributed, while introducing more complexity, from an end-to-end connectivity perspective, in terms of network slice orchestration. Moreover, the enhanced configurability of 5G radio access introduces further challenges as 5G system providers seek to optimize utilization of highly configurable/sliceable core network and radio resources.

The trade-off between flexibility and complexity associated with rendering a diverse array of innovative services over a complex and heterogeneous 5G connectivity fabric, introduces a need for a decision-making platform/infrastructure including configurable decision-making components that did not exist in previous generations of mobile wireless system resources, connectivity, and service capabilities management components.

Improvements to radio resource configuration management, in accordance with the current disclosure, seek to remedy shortcomings in current network connectivity management components of existing systems to effectively manage availability and reliability of network connectivity through beam-pair designation decision-making that effectively exploits new radio interface flexibility arising from capabilities present in massive multiple-input multiple-output (MIMO) physical antenna interfaces such as those now present in, for example, current 5G radio access networks.

SUMMARY OF THE INVENTION

A system and method carried out over a mobile wireless network are disclosed for performing beam pair (BP) and end-to-end (E2E) network slice selection for supporting an invoked service on a mobile equipment (ME). The method includes establishing an initial BP with a radio access network (RAN) node, using an available link policy, enabling communicating a request to the RAN node including an indication of a desired service level for a service invoked on the ME. The method further includes updating, in accordance with the indication of a desired service level, a link policy and an E2E slice policy by performing a reinforcement learning, wherein the link policy is used to select a BP for the ME for a given ME mobility pattern, and wherein the E2E network slice policy is used to select an E2E network slice for the desired service level for the service invoked on the ME. The method further includes selecting an E2E network slice including a target BP selected according to the link policy, to support the service invoked by the ME.

A system is disclosed that includes a processor and a non-transitory computer-readable medium including computer-executable instructions that, when executed by the processor, facilitate carrying out the above-summarized method.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 5B comprises an exemplary table including a set of optimized slice policies ($P_S$) derived from iteratively executed E2E policy exploration operations in accordance with the present disclosure.

DETAILED DESCRIPTION OF THE DRAWINGS

Figure 1:
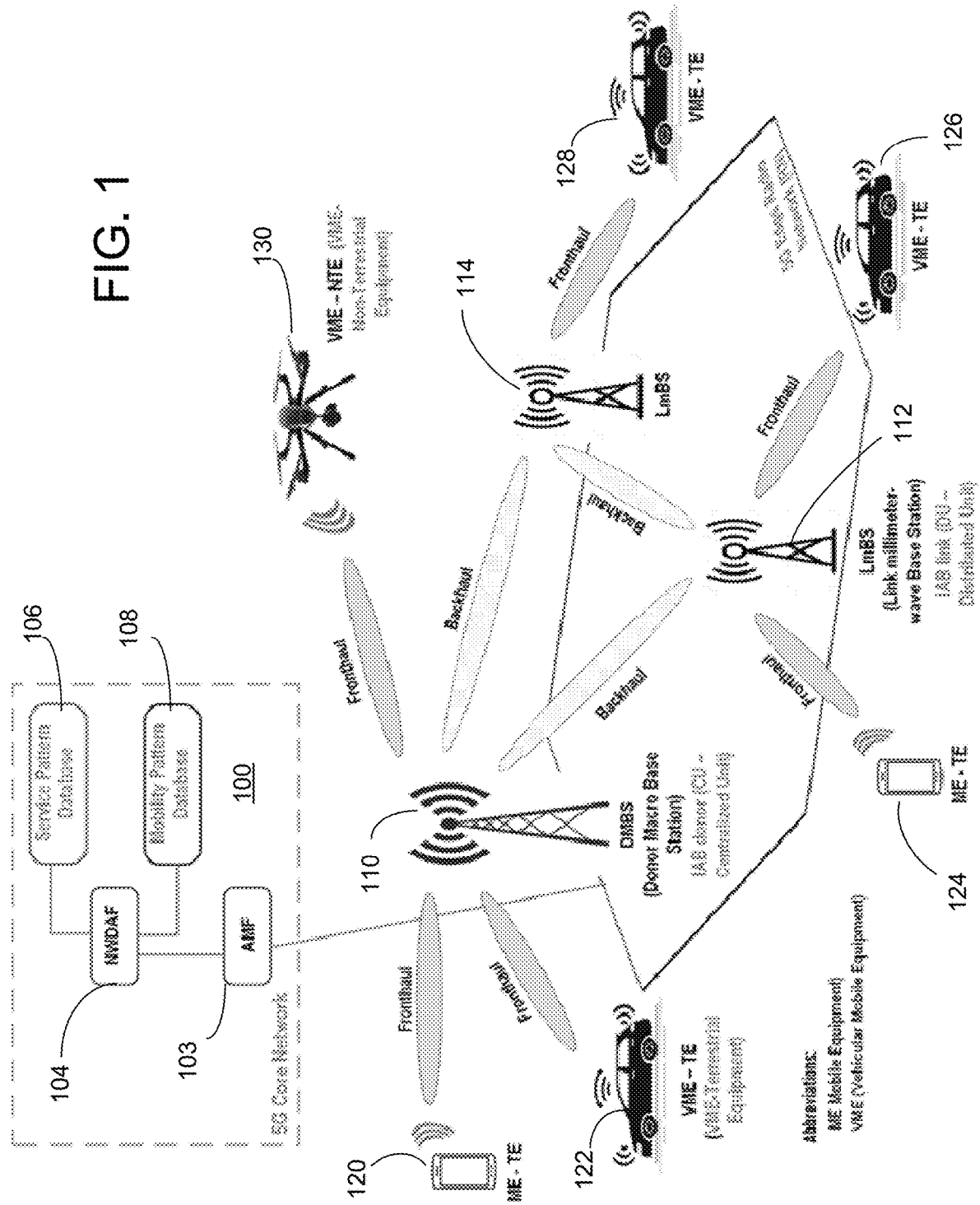
FIG. 1 is a schematic diagram of an exemplary mobile wireless network radio network environment suitable for implementing the features of the present disclosure.

A system, in accordance with the present disclosure, supports a coordinated vehicular mobility over sub 6 GHz and millimeter wave radio access that is assisted by embedded cognitive (machine-learning assisted) capabilities in an integrated access and backhaul 5G system. In particular, the system described herein incorporates an adaptive machine learning-assisted beam selection operation integrated with, and incorporated into, a radio access network (RAN) including a heterogeneous 5G access fabric consisting of millimeter wave access and sub 6 GHz access. Illustrative examples of an adaptive machine learning-assisted beam selection operation described herein have particular utility in facilitating a fast vehicular mobility handover operation between RAN nodes and sub 6 GHz assisted coverage extension.

Enhancement of millimeter wave access to intelligently support fast vehicular mobility handover, in coordination with sub 6 GHz frequency bands, facilitates improved utilization of a wider bandwidth in the millimeter wave spectrum. The improved utilization, in turn, enhances service experience for users, especially in decentralized and distributed arrangements at edges of radio access networks, in a rapidly evolving and advancing 5G infrastructure.

The enhanced radio access/connectivity arrangement described herein provides a variety of advantages including enhancing: (1) service experience in a 5G mobile wireless network infrastructure supporting emerging vertical services having diverse key performance indicator (KPI) demands, including: extremely low-latency, high-reliability, and high-availability; (2) service personalization at the network edge; and (3) in-vehicle services.

The disclosure herein provides improved hand-over operations for mobile and fixed services over a variety of different types of user equipment and human machine interfaces. The network fabric of services and user equipment is expected to operate over a vast variety of wireless connectivity types, where each connectivity type utilizes sub-6 GHZ and millimeter wave radio spectrum, which imposes a variety of unprecedented challenges for a consistently high level of quality and performance by mobile wireless networks for the assurance of a desired user experience that is expected of 5G systems.

The 5G network infrastructure is characterized by a wide-variety of service KPIs, demand, computing, storage, and spectrum resources in a non-deterministic fashion. As such, current methods for enhancing and maintaining mobile wireless network performance, in terms of resource utilization and service experience, are inadequate to provide a needed high degree of adaptability to suit service KPIs in the presence of user terminal mobility and changing wireless connectivity conditions.

Incorporating machine learning into dynamic configuration of beam pair selection for handover operations executed by user equipment, radio access network nodes and a connectivity management platform provides opportunities for optimizing network connectivity by implementing, for example, adaptive beam pair (BP) selection and executing fast handovers in a heterogeneous access environment, under changing wireless connectivity conditions. The adaptability provided by the disclosed arrangement herein provides dynamic configurability that provides BP selection for handover of user equipment that is responsive to changing operating conditions to support a customized 5G service experience.

The disclosed system is characterized by a heterogeneous deployment configuration such as the one illustratively depicted in FIG. 1 having a combination of functional features supporting improved BP selection during handover of a mobile equipment. Such functional features including, for example: (1) dual connectivity between a sub 6 GHz frequency band and a millimeter wave frequency band, (2) a fast convergence of beam selection during handover, (3) a flexible bandwidth allocation based on carrier aggregation, and (4) a utilization of a reinforcement model based upon deep learning. The resulting system facilitates providing an improved management of radio access resources and connectivity characterized by low-latency accurate beam pair selection and fast handovers across base station servicing areas.

Beam pair selection, during a handover operation for mobile wireless equipment in accordance with the present disclosure, involves determination of a target BP exhibiting a transmit-receive beam direction alignment between a RAN node and a mobile wireless equipment node providing sufficient level of signal quality to support a requested service level. A designated transmitter-side beam and receiver-side beam are referred to collectively as a designated beam pair (BP).

Importantly, beam alignment for a selected BP is not necessarily on a "linear/line-of-sight" basis. Rather, a beam pair may be formed by reflection of one or more of the beam pair beams off a reflective intermediate surface. For example, if there is an obstacle between a transmitting and receiving antenna array, then transmit and receive beams are aimed at a reflecting target surface that reflects the beam pairs for both uplink and downlink transmissions.

Moreover, in accordance with illustrative examples, a receiver sees multiple beams from a same or different transmitter. The receiver selects, in accordance with a beam selection criterion and various operational characteristics of each sensed beam (KPI values, channel state information report data at the receiver of the multiple beams, mobility state/status of user equipment, etc.), one of the multiple beams for designation as a target BP with which to receive data. For the downlink, the receiver is at the vehicle mobile equipment (VME). For the uplink, the receiver is at the RAN node associated with a base station.

Digital beamforming, which is synonymous with baseband beamforming, enhances base station capacity by permitting simultaneous use of a same time/frequency resource (e.g. physical resource blocks, PRBs) by multiple effectively/substantially non-overlapping/non-interfering beams to transmit data simultaneously to multiple users. Each signal beam formed between a radio access network node and user constitutes a space-divided further division of physical radio resources supported by a RAN node. In the case of digital beamforming, a given signal is pre-coded in terms of amplitude and phase in a baseband processing phase before actual transmission via a configured beam occurs in the RF domain. Thereafter, analog beamforming is performed in the RF domain for realizing signal gains, through coordinated operation by multiple antenna elements of a (massive) MIMO antenna array. The coordinated operation by multiple elements facilitates transmission of a single data-conveying signal beam that overcomes adverse impact of path loss at the higher frequencies, such as in the millimeter wave range. In accordance with the present disclosure, hybrid beamforming is utilized, where analog beamforming is used to provide a coarse beam having a higher antenna gain. Within the coarse beam, digital beamforming is used for a single user (e.g., SU-MIMO) or for multiple users (e.g., MU-MIMO).

Thus, when seeking to provide desired connectivity in a distributed 5G system consisting of sub 6 GHz base stations and road side units (RSUs), using multiple antenna arrays for transmission and reception provide a variety of system level benefits in terms of providing a higher level of directivity for a beam pair (BP), for realizing desired data rates, extended range, reduced interference, and improved spectrum utilization. This is especially beneficial for a VME, since alignment with a directed beam necessarily suppresses extraneous interference from non-selected beams oriented at other geo-spatial directions.

Selecting a target BP occurs during: (1) an initial access (IA) operating state/stage wherein the VME is in an IDLE state, where the VME has not yet established connection with a base station (BS); and (2) during a handover (HO) operation between a current BP and target BP at a same or new RAN node a beam sensing operating state/stage wherein the VME is in an inactive or a connected operating state, where a handover to a new/better BP may be needed.

At the conclusion of an initial access (IA) procedure, the VME selects a BP for the link between the VME and the BS based on the best reference signal received power (RSRP). Thereafter, the VME provides an identification of the selected beam to the BS via a channel state information (CSI) report. After initial access and set up of a beam pair, management of the BP continues as link conditions change, either at the BS or as a result of VME (or even RAN interface—in the case of a mobile antenna interface of a RAN) mobility.

The disclosure provided herein is directed to effective dynamic BP selection, using machine-learning and reinforcement-based decision making, during both initial access and handover operations between RAN nodes in a manner that provides desired end-to-end connectivity in the mobile wireless network infrastructure.

It is further noted that, for spectrum resource allocation flexibility to suit a service demand, in terms of an associated key performance indicator (KPI) profile, where wider bandwidths for higher capacity, or narrower bandwidths for energy conservation are required, carrier-aggregation or appropriate bandwidth parts may be allocated. This is applicable for both FR1 (sub 6 GHZ) and FR2 (millimeter wave) frequency bands in 5G and future generations of mobile access systems.

Moreover, both a codebook oriented precoder selection from the base station side and a non-codebook oriented precoder selection are jointly performed for selecting a target BP between the RAN node interface and the VME, during the initial-access process based on a given deployment configuration for establishing a robust BP with efficient spectrum allocation.

Turning to FIG. 1, an exemplary mobile wireless network arrangement is illustratively depicted for purposes of describing an implementation of a system and method for managing radio access resources including both hardware and radio spectra through utilization of cognitive (i.e. machine learning-assisted) 5G BP selection (for both initial access and handover operations) at a radio access interface between a mobile wireless network radio interface and a mobile user terminal. The illustrative arrangement includes, in simplified form, a 5G core network (5GCN) 100 and an associated 5G edge and radio network (5GERN) 102—also generally referred to as a radio access network (RAN) 102.

The 5GCN 100 includes an access and mobility function (AMF) 103 that receives connection and session related information from mobile equipment, and uses the received connection and session related information to perform core network tasks relating to connection and mobility management. A network data and analytics function (NWDAF) 104 collects data from the mobile device, network functions, and the operations, administration, and maintenance systems, etc., from 5G Core, Cloud, and edge networks. The NWDAF 104 uses the collected data to perform analytics and inference computations and determinations. Both the AMF 103 and the NWDAF 104 are known components of 5G core networks and therefore will not be further described with respect to the illustrative 5GCN 100 of the illustrative mobile wireless network infrastructure of FIG. 1.

The 5GCN 100, in accordance with an illustrative example, further includes a service pattern database 106 comprising a repository of information associated with distributed and localized resources adapted to support a network slice service. By way of example, the service pattern database 106 includes network information relating to the following general network resource categories: networking (e.g., physical link/channel bandwidth, latency, etc.), data storage, and processing). The processing and storage information maintained by the service pattern database 102 are allocated on a network slice basis over a shared processing and storage platform in the core network 100. The service pattern database 106 includes networking resource entries corresponding to specified network slices (slice resources). Each network slice entry includes, for example, attributes based on a Generic Slice Template (GST). The various network slice entries provide a set of defined network resources that, as a group, facilitate flexible deployment models to suit diverse business models, and service use cases. An example of a set of attributes defining a particular network slice include, by way of example, the following:

Frequency band,
Bandwidth,
Base station Identity (PLMN ID),
Service KPI (latency, access type (terrestrial, non-terrestrial), priority, QoS marking, bit rate), and
Single Network Slice Selection Assistance Information (S-NSSAI) including: slice/service type (SST) that defines/describes network slice behavior in terms of features and services (eMBB, IoT, URLLC), and slice differentiator (SD) that enhances the SST information to differentiate network slices having a same SST. The S-NSSAI serves as an end-to-end network slice descriptor for a given end-user service invocation, across the 5G Core (5GC), 5G Radio Access Network (5G-RAN), and the mobile device/user equipment. The S-NSSAI is associated with the PLMN ID. In an illustrative example, the S-NSSAI is used directly by an agent directly based on the S-NSSAI information and other service profile related information received from the ME for determining whether a match exists in the service pattern database 106, for immediate exploitation in response to an invoked service and KPI profile. In the illustrative example, entries within the service pattern database 106 store a "slice pattern" and an "optimized slice policy $P_S$" described herein below with reference to FIG. 5B.

The 5GCN 100, in accordance with an illustrative example, also includes a mobility pattern database 108 that comprises a repository of information associated with initial and subsequent access patterns of mobile equipment with the radio access system, including for example, the RAN 102. In the illustrative example, entries in the mobility pattern database 108 store a "mobility pattern" and an "optimized link policy $P_L$." described herein below with reference to FIG. 5A.

In accordance with a simplified illustrative example depicted in FIG. 1, the RAN 102 comprises a plurality of RAN nodes, including, for example, a wide area macro coverage base station (MBS), such as a donor macro base station (DMBS) node 110 and a millimeter wave coverage base station (mBS), such as a link millimeter-wave base station (LmBS) nodes 112 and 114. In the illustrative RAN the LmBS nodes 112 and 114 are, for example, a small footprint base station configurations including one or more antenna arrays capable of beam-based radio connectivity with mobile wireless equipment (ME). The ME are any of a variety of devices including mobile phones 120 and 124 (ME-TE's); vehicle mobile wireless equipment (VME) 122, 126 and 128; and a non-terrestrial vehicle mobile wireless equipment (VME-TE) 130 such as drones.

In accordance with illustrative examples described herein, the DMBS node 110 and the LmBS nodes 112 and 114 utilize beam pair selection criteria configured according to an output of cognitive (i.e., machine learning-assisted) processes and operations incorporating reinforcement learning (e.g., Federated Reinforcement Learning (FRL))—the output of which is used to configure beam pair selection policy databases that support configuring/updating criteria for performing dynamic BP selection by/between the RAN nodes (MBS or mBS nodes) and the ME apparatuses and thereby facilitating seamless 5G service handovers arising, for example, from re-location of an ME apparatus connected to a current RAN node via a current BP. A handover to another BP may be necessitated by any of a number of triggering conditions including, for example, degradation of service level provided by a serving base station (SBS) RAN interface node associated with a current BP.

Directivity and diversity of air signals through a spatial multiplexing of multiple antenna transmission and reception streams facilitate achieving higher throughput and spectral band usage efficiency in RAN nodes. Regarding the RAN nodes illustratively depicted in FIG. 1, digital beamforming facilitates simultaneous transmitting and/or receiving multiple beams in different directions within a same frequency band. The shape and direction of individual beams of the simultaneously transmitted beams is achieved by configuring a phase and amplitude scale factor for each antenna element of a MIMO antenna assembly comprising an array of antenna elements. By way of example, such beam shaping and directionality is achieved through use of a precoding matrix of weights that are applied to both a demodulation reference signal (DMRS) and the data for a VME receiver to properly decode a received pre-coded signal in a beam pair. Thus, in accordance with the disclosure herein, precoding at the BS allows for multiple spatially distributed beams to be transmitted through multi-layer transmissions in a MIMO system. Through the application of different phases and appropriate weighting for each antenna element in an array of a MIMO antenna, multiple streams of data are transmitted, such that the data throughput is potentially increased at each RAN node.

Additionally, joint coordination between RAN nodes, including, for example, a wide area macro coverage base station (MBS), such as the donor macro base station (DMBS) node 110 and a millimeter wave coverage mBS, such as the link millimeter-wave base station (LmBS) nodes 112 and 114, can be arranged for dual (fronthaul/backhaul) connectivity and carrier aggregation scenarios for variable bandwidth allocations.

The virtualization of the 5G core network (5GCN) 100 and the associated 5G edge and radio network (5GERN) 102—also more generally/generically referred to as a radio access network (RAN) 102—facilitates realization of virtual network function (VNF) arrangements, and allows for flexible and disaggregated allocations of networking, computing, and storage resources in diverse configurations of end-to-end (E2E) network slicing to suit a changing current requested service demand. Incorporating flexibility of E2E network slice configurations, over shared and common hardware resources, presents a potential to achieve a reduction in capital expenditures, while leveraging system-wide machine learning-assisted capabilities through, for example, reinforcement learning. However, supporting such highly configurable E2E network slicing arrangements introduces complicated decision-making that is further complicated by a wide variety of factors and conditions under which the RAN 102 and the various MEs operate. In that regard, machine learning-assisted configuration of BP selection criteria facilitates decision-making under complex scenarios and therefore facilitates reducing operations expenditures, improving allocation of limited network resources. The machine learning-assisted configuration of BP selection criteria (policies) thus enables incorporation of complex real-time decision-making utilized during autonomous handover and beam pair selection decision-making at individual base stations/RAN interface nodes. Such distributed decision-making enables implementing a wide variety of sophisticated E2E network slicing configurations to suit diverse and variable service demand (as measured, for example, by one or more KPIs).

With continued reference to FIG. 1, the flexible and distributed allocation of networking, computing, and storage resources in diverse configurations of E2E network slicing, to suit current service demands at individual RAN interface nodes, is complemented by integrated access and backhaul (IAB) arrangements of a variety of base station nodes (e.g., MBS and mBS nodes), associated with RAN air interfaces operating in the FR1 (Frequency Range 1-sub 6 GHZ) and FR2 (Frequency Range 2—millimeter wave above 24 GHZ) frequency band ranges. As will be readily appreciated, IAB arrangements facilitate high throughput capacity deployments where, in the case of RAN interfaces having massive MIMO antenna array arrangements, an ability to generate directed/narrow signal beams facilitates enhanced low-latency/high-capacity transport for simultaneously supporting requested service level demands from spatially distributed ME apparatuses having individual service demands having associated stringent service level (KPI) requirements.

In accordance with the illustrative example of FIG. 1, the individual RAN nodes support backhaul network links comprising focused beams enabling simultaneous support of air-based backhaul links (between RAN nodes) that do not interfere with fronthaul links operating in a non-overlapping space with respect to the backhaul links depicted, by way of example, in FIG. 1. Such ability to support, on a substantially continuous basis, high-bandwidth backhaul links avoids costly build-out and maintenance of wired backhaul infrastructure for RAN nodes, such as the LmBS nodes 112 and 114 depicted in FIG. 1.

Continuing the description of an exemplary RAN arrangement, with reference to FIG. 1, the IAB configuration facilitates configuration of an arrangement including both: (1) mBS entities at the edge of the RAN 102 that serve as LmBS nodes that support both fronthaul and backhaul wireless links; and (2) MBS entities, connectively close to the 5G core network (5GCN) 100. The exemplary 5G RAN arrangement facilitates intelligent partitioning and allocation of fronthaul and backhaul beams—including using 5G procedures for control and data transport for an adaptive and dynamic access for any ME node of any of a variety of ME apparatus types (e.g., VME-TE, VME-NTE) and related service requirements.

With continued reference to FIG. 1, the DMBS node 110 is a centralized unit (CU) base station configured to carry out control and upper layer functions in the RAN 102 arrangement. By way of example, the DMBS node 110 carries out a variety functions including: a radio resource control (RRC), a service data adaptation protocol (SDAP), and a packet data convergence protocol (PDCP) in the exemplary mobile wireless network. The link millimeter-wave base station (LmBS) nodes 112 and 114 are distributed units (DUs) configured to carry out a variety of functions including: a radio link control (RLC), a medium access control (MAC), and a physical layer (PHY). The use of an adaptation layer above the RLC facilitates an end-to-end connection between the CU and a chain of two or more DUs that form the farthest edges of a multi-edge backhaul path in the 5GERN (RAN 102).

Having described an exemplary RAN arrangement for carrying out BP handover in accordance with the present disclosure, attention is directed to an arrangement for a machine-learning based configuration of criteria/policies for improved selection of a target BP when executing such handovers in accordance with BP selection criteria/policies configured and updated in accordance with a model-free reinforcement learning arrangement. The model-free reinforcement learning arrangement is, for example, a Q-learning arrangement that is configured and executed to pursue/seek to determine an optimal policy for both: (1) a target BP, i.e. link policy—$P_L$, for a given ME and RAN state; and (2) an end-to-end network slice—i.e. slice policy $P_S$, in a network potentially including both fronthaul and backhaul air interface (radio) links, such as the example network summarized in FIG. 1. Moreover, target BP selection for performing an initial access (IA) or handover of an ME is carried out in accordance with a current configuration of both: (1) a link policy ($P_L$), and (2) an E2E network slice policy ($P_S$) established by the model-free reinforcement learning (e.g., Q-learning) arrangement. An example of such model-free reinforcement learning arrangement is summarized in FIG. 2 described herein below.

Figure 2:
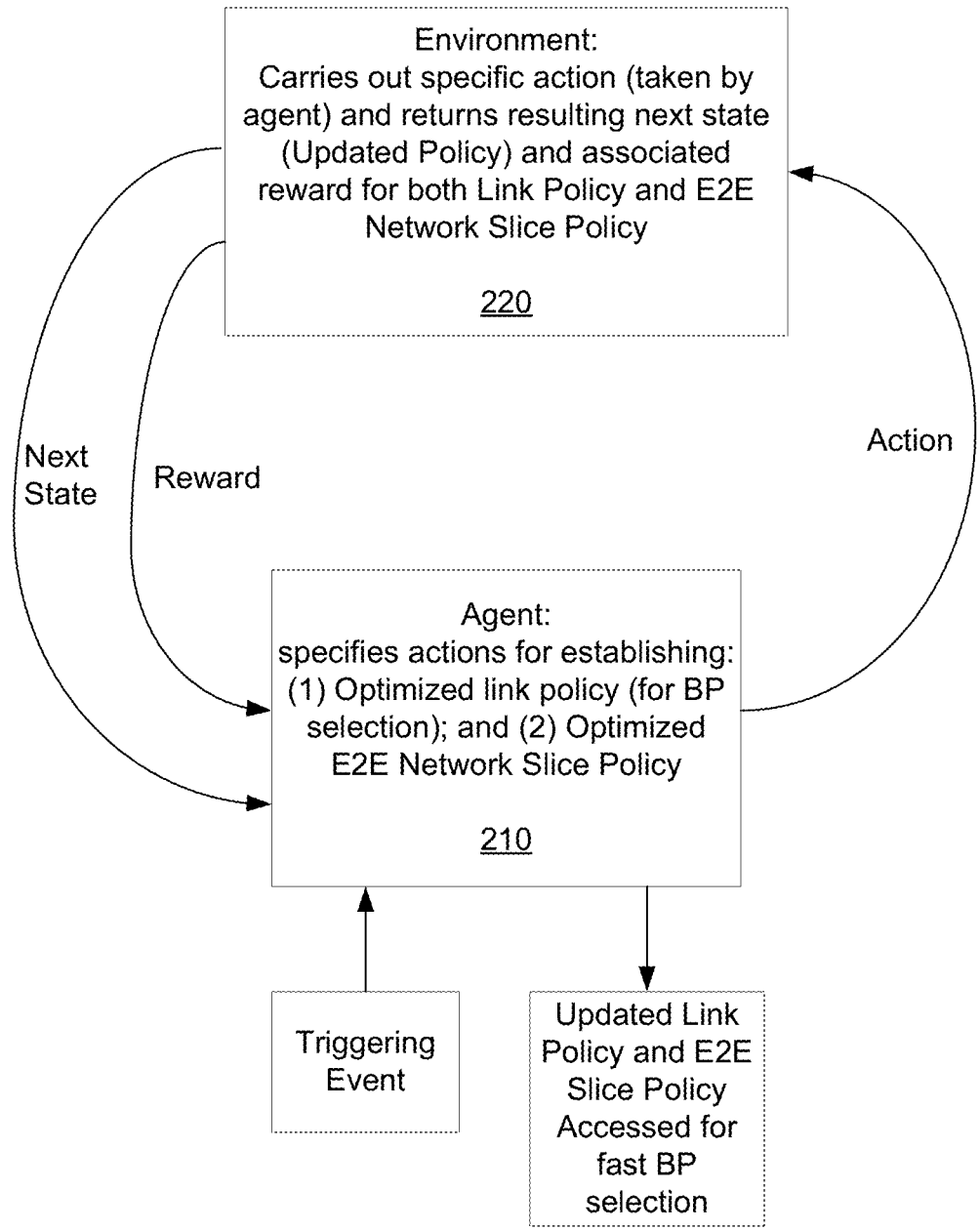
FIG. 2 is a flow diagram summarizing an exemplary reinforcement-based machine learning assisted beam pair policy configuration arrangement for building and updating a policy database for conducting BP designation for both initial access and handover operations in a mobile-wireless network in accordance with the present disclosure.

Turning to FIG. 2, an exemplary iterative/feedback-based model-free reinforcement learning (q-learning) arrangement is summarized for implementing machine learning-assisted BP selection policy management in a RAN arrangement such as the one depicted, by way of example, in FIG. 1. The q-learning operation summarized in FIG. 2 is carried out, for example, by the NWDAF 104, of FIG. 1 described herein above, accessing a conditional handover (CHO) table in the mobility pattern database 108 and service pattern data provided in the service pattern database 106 associated with the AMF 103. The q-learning methodology is performed, for example, by executing each of a plurality of stages with each stage comprising multiple iterations of q-learning to: (1) initially establish an optimized link policy and corresponding BP selection during a link policy optimization stage, and (2) thereafter establish, based upon the optimized link policy and resulting BP selection, an optimized E2E network slice policy during an E2E network slice policy optimization stage.

In accordance with the multi-stage reinforcement learning (e.g., q-learning) arrangement, an agent 210 is activated in response to a request arising from any of a variety of triggering events detected by a component of the RAN 102. By way of example, q-learning may be invoked by an ME mobility event including: a handover operation, and/or a radio link failure. The q-learning, while not invoked each time such ME-related event is detected, can be invoked as a result of an accumulated quantity of detected events (within a specified time period, resulting in a link failure rate threshold being exceeded) that cause invoking of q-learning upon reaching a threshold quantity/rate of detected link failure events and/or sufficient passage of time after a previous invocation of the q-learning. Additionally, an iteration of the q-learning arrangement may be invoked by an ME service level requirement event wherein the ME invokes a service having an associated E2E wireless network slice service level requirement that exceeds a specified service level.

In an exemplary q-learning scenario carried out by the agent 210 and environment 220, q-learning is initially performed by the agent 210 and the environment 220 to establish an optimized link policy for selecting a beam pair between the ME and a node of the RAN 102 supporting a service level (KPI requirements) requested by the ME. In an illustrative example, the optimized link policy is used by the agent to select a beam pair for an ME and corresponding RAN interface/node. Thereafter, in cooperation/coordination with the optimized link policy, during a subsequent E2E network slice optimization stage of the q-learning, an optimized E2E network slice policy is established in accordance with the previously established optimized link policy and selected BP for the EM and RAN. It is expressly noted that the order of performing link policy optimization and E2E network slice policy optimization is not necessarily limited to any particular order. In fact, the q-learning may alternate between iterations of link and slice policy optimization iterations of the q-learning process to ensure that an optimized version of either the link or slice policy does not have an excessive impact upon the other.

Figure 5A:
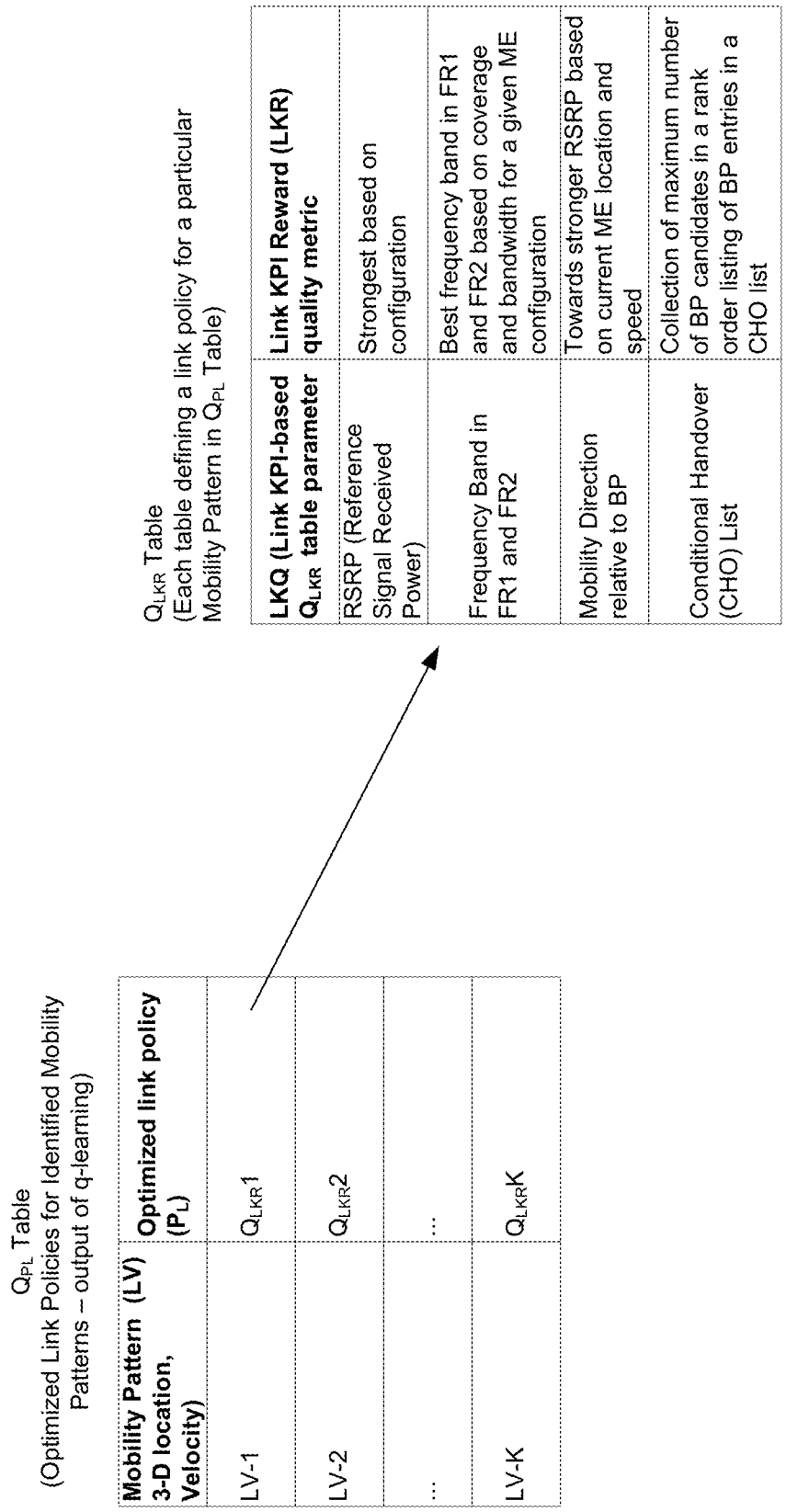
FIG. 5A comprises an exemplary table including a set of optimized link policies ($P_L$) derived from iteratively executed link policy exploration operations in accordance with the present disclosure.

After being invoked by any of a variety of event occurrences, the agent 210 determines/assesses a current state of an environment 220. Based upon information associated with the network status change that caused invocation of the q-learning and the current state of the environment 220, the agent 210 specifies an action to be processed by the environment 220. In accordance with an illustrative example, the agent 210 formulates the action for processing by the environment 220 that includes both: (1) a current link policy, and (2) current E2E network slice policy configuration. An example of the link policy is provided, by way of example, in the link policy table structure summarized in FIG. 5A. An example of the E2E slice policy is provided, by way of example, in the E2E slice policy summarized in FIG. 5B. Thus, in accordance with an illustrative example, the action specified by the agent 210 includes proposals for: (1) a link policy, and (2) an E2E network slice policy that is intended to meet a target state requirement. Such target state requirement may be, for example, a service level request, by an ME connecting at a particular RAN interface in a mobile wireless network, that cannot be met by a current configuration of the RAN interface. A specific "action message" issued by the agent 210 to the environment 220, by way of example, includes: (1) a sequence of measurements, and (2) a corresponding action (e.g. the current link policy and E2E network slice policy configurations to be processed by the environment 220. In each of the two cases the measurement and a corresponding action are provided, for example, in accordance with the entries listed in the QLKR table (FIG. 5a) and QSKR table (FIG. 5b).

The specified action is thereafter processed by the environment 220 and causes the environment 220 to transition from a current state to a next state corresponding to the action specified by the agent 210, with the state transition having an associated reward (which may be positive or negative). In a simplest case, a positive or negative response (+1 or −1) is returned to the agent 210 with the new state, thereby indicating the effect of the previously proposed action by the agent 210 to the environment 220. The +/−response represents, for example, the relative improvement in network performance associated with the next state as a result of the specified action in a current iteration of the q-learning process.

Thus, in the context of the illustrative example, in response to receiving an action specified by the agent 210, the environment 220 determines: (1) a next state corresponding to a state transition from the current state to one of a set of action-specific predefined next states), and (2) a corresponding reward arising from carrying out the specified action. The environment 220 returns the new state ($S_{t+1}$) and associated reward ($R_{t+1}$) to the agent 210.

Thus, in summary, for each state (e.g. a particular configuration of an E2E network slice policy), the reinforcement learning arrangement summarized in FIG. 2 includes a set of actions resulting in a transition to another one of the set of states, and a reward (value/score) associated with each action and corresponding transition between the current state and an action-specific next state.

The agent 210, in accordance with an iterative aspect of the process summarized in FIG. 2, determines a "next" action to be specified to the environment 220 based upon the received next state and associated reward. Examples of potential actions for link policy optimization and BP selection include identifying and selecting an alternative beam (frequency band, or other radio access resource) for one or both of a BP for an invoked service and associated KPI profile. Examples of a reward are improved quality score for a radio access resource such as increased bit transmission/reception rates, reduced interference, etc. The iterative interaction between the agent 210 and environment 220 (specifying actions in view of returned state transitions and associated reward) continues, with the agent 210 specifying a next action in accordance with a next state and associated reward provided by the environment 220 in response to a previously specified action. The iterative interaction terminates in accordance with the agent 210 detecting a state of convergence (i.e., the reward cannot be improved by further action—such as for a given location and mobility condition, the best access type, together with other supporting attributes for a service type has been found). Additionally, the iterative interaction is terminated after performing configurable number of iterations of specifying an action and observing a corresponding reward. A returned positive value implies an improvement in terms of an inferred quality comparison, with respect to the link attributes and the network slice attributes. In addition to specifying a +/−value, another example of a way to specify a reward is a "percentage improvement" of a KPI.

The following summarizes a general procedure implemented by the entities schematically depicted in FIG. 2, in particular, a target state (e.g., a best composite of KPI values for a RAN resource) is reached by performing the following:
1. A system is placed in an initial state.
2. A mobile device issues a request that invokes a network communications service.
3. The agent 210 processes the service invocation and the agent 210 performs a combination of exploration (determining optimized policies) and exploitation (using the resulting policies) to meet the network requirements associated with the invoked service. The agent 210 uses a feedback loop with the system environment for interpreting observations and takes an action (e.g., find link, resources etc., mentioned earlier) to identify/select a required link and the appropriate slice configuration, which includes the link.
4. The agent 210 proceeds to take actions, governed by rewards/penalties, until the reinforcement learning process transitions to a target/end (ideally optimized) state corresponding to a slice policy supporting the UE service invocation that triggered operation of the reinforcement learning process. In a system where both a database of slice policies and a reinforcement learning arrangement for generating new slice policies in response to new service requests (accompanied by a KPI profile) are available to dynamically obtain an updated E2E network slice policy (slice policy), a service/KPI profile triggered updated slice policy may be obtained in one or more of the following ways: (1) by performing a configured number of iterations of specifying an action and receiving a corresponding next state and associated reward, (2) by reaching a threshold quality level for parameters/attributes of both a link and a network slice needed by an invoked network service, and/or (3) by identifying a policy previously stored in the NWDAF 104 that will meet requirements of an invoked service—thereby short circuiting the reinforcement learning process altogether.

In accordance with a particular example, FIG. 2 the model-free reinforcement learning (Q-learning) renders configured/updated E2E network slice policies ($P_s$) corresponding to invoked services and associated key performance indicator (KPI) profiles. Once configured by the above-summarized iterative process, the agent 210 processes operating in the NWDAF 104 store the resulting E2E network slice policies arising from particular invoked services and associated KPI profiles in a CHO table maintained by the NWDAF 104 (see FIG. 1). The resulting CHO table includes a set of service/KPI profile-specific entries (E2E network slice policies) and link policies that guide executing, in accordance with requirements of an invoked service, conditional fronthaul BP switching between RAN nodes and MEs as well as backhaul BP switching between the RAN nodes themselves to facilitate backhaul communications. As such, in accordance with the model-free reinforcement learning methodology summarized in FIG. 2, the contents of the CHO tables are distributed by the NWDAF 104 to individual RAN nodes that perform the actual BP configuration/switching in accordance with the link policies and the E2E network slice polices configured and provided in accordance with the q-learning arrangement described herein above.

In accordance with another illustrative implementation of the model-free reinforcement learning, the illustrative E2E network slice policy configuration arrangement incorporates iteratively performed interactions between an agent 210 process and an environment 220 process. The environment 220 incorporates a set of states, where pairs of the states are connected by directed edges. In accordance with an exemplary Q-learning arrangement, each directed edge between two states corresponds to a pre-defined input action (e.g. invoked service and associated KPI profile) specified by the agent 210 to the environment 220.

In response to a received action specified by the agent 210, the environment 220; processes the specified action, performs a state transition to a next state in accordance with the processed action, and issues a response to the agent 210. The response to the agent 210 includes: (1) the next state (arising from a state transition along a directed edge from the previous state corresponding to the specified action), and (2) associated reward (e.g., network performance improvement in relation to the previous state) for the action specified by the agent 210.

By way of example, the reward (value/score) indicates whether the action of the agent 210 (e.g. a change to a current E2E network slice policy) results in a system state (a next E2E network slice policy state) or link selection that is closer to/farther from an optimal configuration of E2E network slice policy or link policy for an invoked network service.

The feedback-based Q-learning arrangement depicted in FIG. 2, repeats until the Q-learning arrangement converges to a state (e.g. E2E network slice policy configuration) for the system of interest (e.g., the RAN network of FIG. 1) supporting a specified service having an associated KPI profile.

The reinforcement learning arrangement summarized in FIG. 2 is further characterized by a "learning rate" that establishes an extent to which a newly received state and associated reward overrides previously received state and reward information. The reinforcement learning further incorporates a discount factor that establishes value of rewards associated with future actions. The discount factor ranges from zero (no consideration of future rewards) and 1 (high consideration of future rewards).

In accordance with an illustrative example, the results of the iterative reinforcement learning operation are stored in tables facilitating a fast selection of a beam pair (BP) during a handover operation in accordance with a CHO table configured by the reinforcement learning arrangement described herein.

With continued reference to FIG. 2, upon completing the q-learning process, the agent 210 selects a target BP and an E2E network slice (based upon the current optimized link policy and slice policy) for an identified ME having particular characteristics including a service request having an associated KPI profile, where KPI profiles specify a variety requirements (e.g., low-latency, high-reliability, minimum bandwidth, non-delay sensitivity, media type, etc.) for various service categories. The results of such interactions, in the form of new E2E network slice policies ($P_s$), are provided by the AMF 103 to the NWDAF 104 (updating one or more CHO tables).

In accordance with the illustrative example of FIG. 2, a model-free reinforcement learning methodology is iteratively executed between the agent 210 and the environment 220 to facilitate rendering an optimized slice policy ($P_S$), conforming to a configured policy target, dynamically aligned with the KPIs associated with a given end-user service, for an E2E network slice in a conditional handover (CHO) table stored in the network data and analytics function (NWDAF) database 104 of the access and mobility function (AMF) 103. Importantly, the process/arrangement depicted in FIG. 2 includes the agent 210 rendering a link policy ($P_L$) for identifying preferred/desirable BPs. The resulting optimized link policy ($P_L$) is further used to specify an optimized slice policy ($P_S$) for designating an end-to-end network slice (E2E network slice) meeting the service needs of an ME.

The reinforcement-based learning process summarized in FIG. 2, through iterative exploration and exploitation operations performed during each executed episode, updates and utilizes the CHO table containing a rank ordering of signal strengths of detected BPs to select a BP, based on a link policy ($P_L$), based on the entries in a $Q_{LKR}$ table (see FIG. 5A described herein below). The number of episodes (iterations of the feedback cycle between the agent 210 and environment 220 in FIG. 2) is configured in advance, and the process summarized in FIG. 2 is invoked after each mobility event (change in the BP strength below a configured threshold).

For a given ME location and velocity vector (i.e. speed and direction in space), if a best BP or a BP with a satisfactory KPI is found, before detection and measurements are completed, then the $Q_{LKR}$ table entry is selected. The reinforcement-based learning process summarized in FIG. 2 exploits the knowledge of such BPs to select the best BP for the current location and velocity of the ME.

Upon completion of the configured episodes of the reinforcement-based learning process, a latest status of the $Q_{LKR}$ table is stored by the NWDAF 104, together with the CHO table containing rank ordered BP entries, which reflect the latest optimized link policy $P_L$ entries. The CHO table is updated with results of each execution of the configured set of episodes of the process summarized in FIG. 2 and can be subsequently used by any ME (both vehicular and hand-held terminals) having a similar location and velocity (trajectory of mobility) for rapidly converging upon a BP selection by exploiting the results of previous reinforcement-based learning incorporated into the ranked listings contained within the CHO table maintained by the NWDAF 104. Moreover, it is noted, in closing, that the reinforcement-based learning exploration is applied only when needed, such as in the case of a change to configuration of the RAN 102, or when the database is new, requiring beam detection, measurement, and establishment of a BP.

Figure 3:
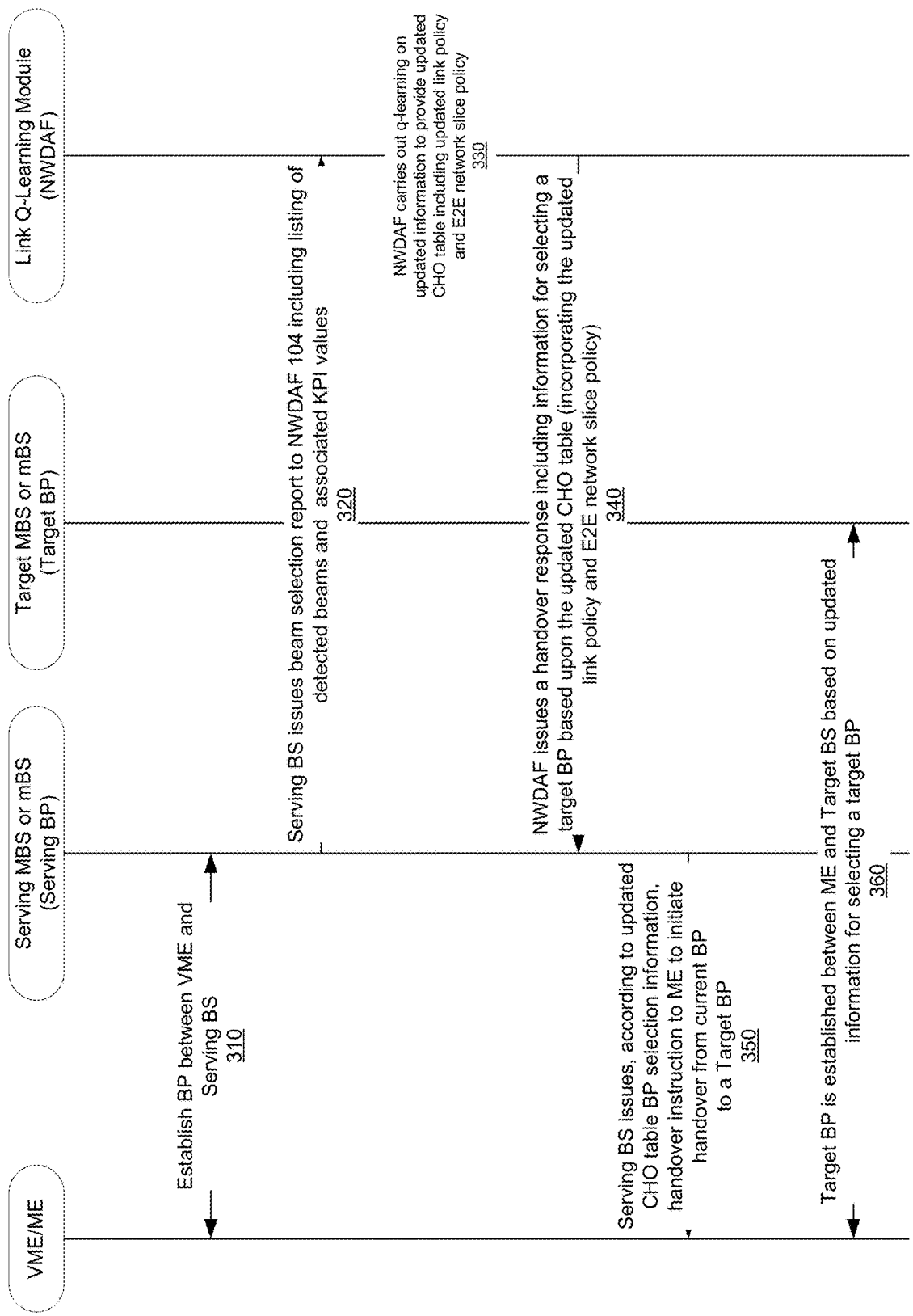
FIG. 3 is an exemplary sequence diagram summarizing messaging/decision-making during and initial access and handover between a serving radio interface node and a target radio interface node in accordance with the present disclosure.

Turning to FIG. 3, a sequence diagram summarizes an exemplary initial access (IA) procedure in accordance with the current disclosure. In the illustrative example, the identified stages/operations carried out by/between an ME (e.g., VME 122), a serving base station, a target base station, and a networked NWDAF (e.g., NWDAF 104 associated with the AMF 103 in the 5GCN 100) executing a module configured to manage BP selection policies in accordance with a rank ordered set of candidate BP entries in a conditional handover (CHO) table maintained by the NWDAF and rendered by a reinforcement learning-based arrangement such as the one summarized in FIG. 2 described herein above. The initial access process summarized in FIG. 3 is also applicable for a handover scenario, in a case where a mobility event occurs with respect to an ME necessitating choosing a new BP for the ME. The resulting/selected target BP that serves the ME may be at a same RAN node (a different beam in a multi-beam RAN air interface) or at a different RAN node. Moreover, there may/may not be a change in AMF operating as the serving AMF in the 5GCN 100, depending on whether a mobility event of the ME crosses an RAN node or an AMF serving area boundary.

In accordance with the exemplary initial access (IA) procedure summarized in FIG. 3, during stage 310 a beam pair is first established, without reference to the CHO table, between an ME and a serving RAN node (associated with a serving base station). Such initial access may occur in any suitable manner and is not necessarily a best BP for the ME. In accordance with the present disclosure, during 320 the serving base station associated with the serving RAN node provides a selection report to the networked NWDAF 104 executing the reinforcement-based learning (e.g. Q-learning) arrangement summarized in FIG. 2. The selection report includes: an identification of the serving base station, and a list of detected beams for establishing beam pairs (including associated weighted KPIs for each beam). During 330, the NWDAF 104 updates the link policy and E2E network slice policy by executing the reinforcement-based learning arrangement based upon the current beam selection and the CHO table of the NWDAF 104 updated with the provided KPI information.

Thereafter, during 340, the NWDAF 104 issues a handover response, based upon the current/updated link policy and E2E network slice policy, to the serving base station. The response contains information and/or instructions for guiding the ME and RAN 102 selecting a particular target BP for performing a BP handover. The handover response includes updated BP selection information of the updated CHO table, rendered by the reinforcement-based learning (see FIG. 2), based upon the CHO table updated during 330 according to the list of beams and associated KPI information provided during 320. By way of example the joint handover inference includes information sufficient to enable the ME and serving BS to perform a BP selection and initiate a handover in accordance with the BP selection in accordance with the results of the reinforcement-based learning operation executed during 330. Thereafter, during 350 the serving BS issues a handover instruction to the ME on the BP established during 310. The handover instruction includes, sufficient information for the ME to initiate a handover from the current BP (established during 310) to a target BP arising from the updated CHO table and resulting joint handover inference provided to the serving BS during 340. Thereafter, during 360 the ME initiates establishing the target BP with a target RAN node (and associated target BS).

While the operations of FIG. 3 (and the related FIG. 2) may be potentially executed at any time and/or in response to any triggering event, it is contemplated that the operations occur in response to significant RAN 102 configuration/status updates (including changes to physical configurations as well as communication traffic patterns) having a significant impact on the KPIs of currently configured beams of the RAN 102 interface nodes.

Figure 4:
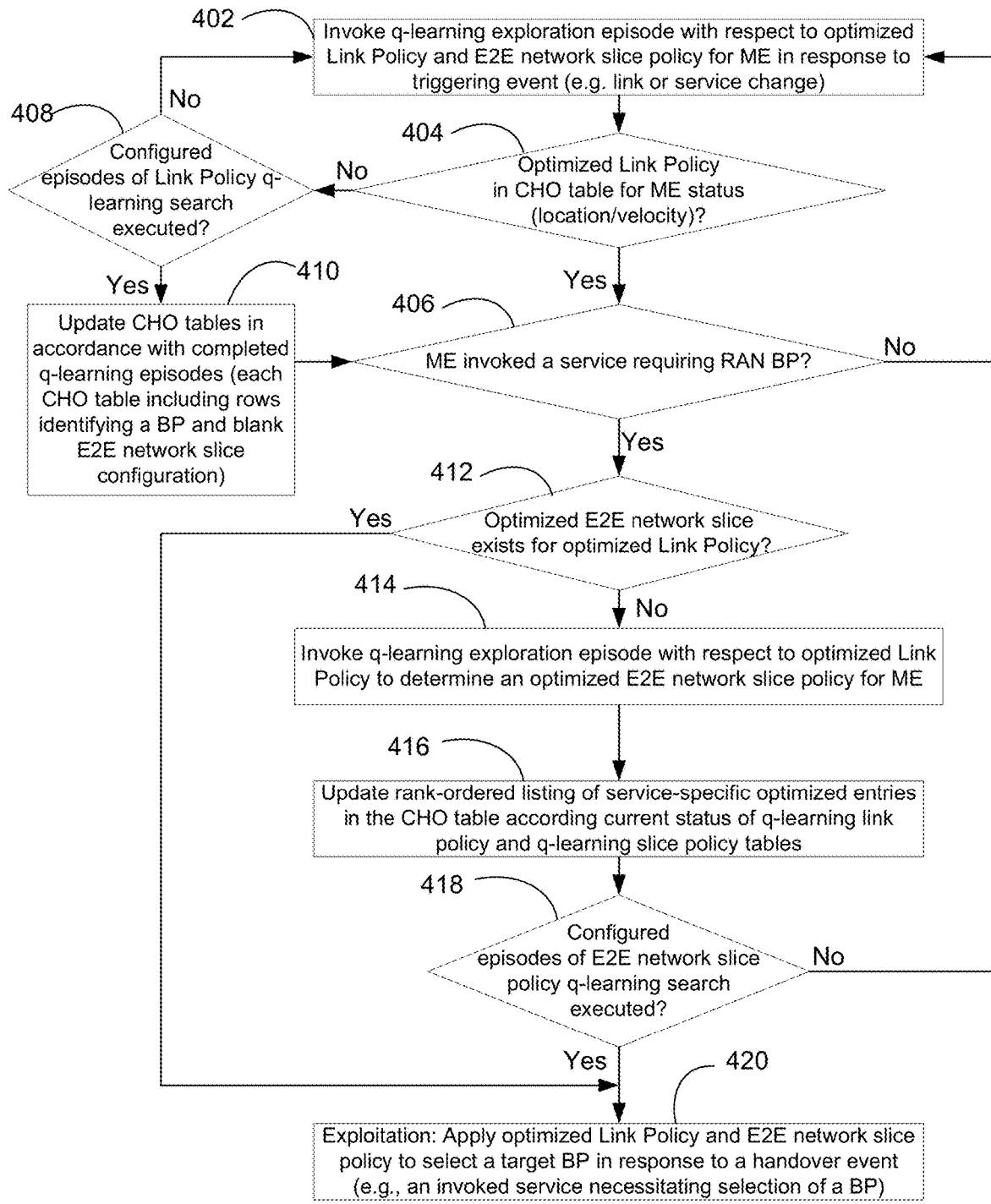
FIG. 4 summarizes an exemplary set of operations for designating an end-to-end solution-based handover incorporating the exemplary reinforcement-based machine learning assisted beam pair designation for handover of FIG. 2 in accordance with the present disclosure.

Turning to FIG. 4 a flow-chart summarizes operations detailing an illustrative example of the general operations summarized in FIG. 2 for implementing reinforcement-based learning to improve beam pair selection in the RAN 102 guided by an E2E network slice policy and associated link policies. In accordance with the illustrative example, the reinforcement-based learning operation performs a set of episodes, including exploration and exploitation states, to designate a target BP and a corresponding/resulting E2E network slice (including the RAN 102) for carrying out a handover operation with the goal of maintaining a current service experience upon completion of the handover operation—in a potentially heterogeneous and distributed MBS and mBS system configured for multi-access edge computing (MEC).

In response to a triggering event (e.g. a RAN 102 link change or a service change for an ME), during 402, an exploration episode is executed of the reinforcement-based learning arrangement. During 402, an action (e.g., selection of a particular one of multiple listed beams for a beam pair) is processed to render a corresponding reward during execution of a reinforcement-based learning arrangement search for a best link policy and E2E network slice policy. Thereafter, during 404 a determination is made regarding whether a suitable link policy exists in the CHO table corresponding to a current location and velocity of the ME seeking to establish a new BP during an initial access or handover operation with a RAN 102. If such suitable link policy is found during 404, then control passes to 406 wherein a further determination is made with regard to whether the ME has invoked a service for which a beam pair is needed. If, during 404, no suitable link police is determined to exist, then control passes to 408.

At 408, a further determination is made regarding whether the reinforcement-based learning has executed a configured quantity of BP exploration episodes. If the configured quantity of BP explorations has not been reached, then control passes to 402 to execute a further episode. However, if the configured quantity of BP exploration episodes have been executed, then control passes to 410.

During 410, entries in the CHO table are updated in accordance with the results of executing the exploration episode (during 402) the configured number of times. By way of a particular example, a rank-ordered list of a link-specific policy ($P_L$) is updated in the CHO table based upon the results (the current status of a $Q_{LKR}$ table) after executing the configured quantity of exploration episodes. By way of example, each row of the CHO table includes a specific BP and a blank (currently unspecified) E2E network slice configuration. Control then passes from 410 to 406.

At 406, if RAN service has not been invoked at the ME, then control returns to 402. However, if a RAN service is invoked then control passes from 406 to 412 described herein below with reference to FIG. 4.

During 412, a determination is made regarding whether an E2E network slice policy exists that corresponds to the link-specific policy. If such E2E network slice policy does not currently exist, then control passes to 414. During 414, corresponding $Q_{LKR}$ and $Q_{SKR}$ tables are updated in accordance with executing an episode of a configured quantity of reinforcement-based learning episodes for establishing an E2E network slice policy and link-specific policy. Control then passes to 416 wherein a rank-ordered list of a service-specific optimized entries in a conditional handover (CHO) table is updated based upon the current status of the $Q_{LKR}$ and $Q_{SKR}$ tables. By way of example, each row of the CHO table of the rank-ordered list includes a BP and an E2E network slice.

During 418, a determination is made regarding whether the reinforcement-based learning has executed a configured quantity of exploration episodes for establishing an E2E network slice policy for RAN service currently invoked by the ME (per operation 406 described herein above) after establishing a corresponding link policy by executing a configured quantity of exploration episodes (per operation 408). If the configured quantity of slice policy explorations has not been reached, then control passes to 402 to execute a further episode. However, if the configured quantity of exploration episodes have been executed, then control passes to 420.

During 420, the established link policy and corresponding end-to-end slice policy are exploited to provide for rapid determination of a BP for a service invoked by an ME in accordance with the CHO tables updated in accordance with the detailed operations set forth in FIG. 4.

Turning to FIG. 5A, an example is provided of link policy-related table structures, of link policies stored in the mobility pattern database 108 that is maintained/managed by the NWDAF 104 and replicated to any of a variety of mobile wireless network nodes as CHO tables for establishing BPs. The link policy table structures are generated and updated during operation 414 in accordance with a reinforcement-based learning arrangement for providing a link policy for a RAN node of a RAN 102 in accordance with the disclosure. The entries within the $Q_{LKR}$ (link, KPI, reward) table are link policy entries that are accessed (during exploitation/use of the configured $Q_{LKR}$ table) in accordance with entries of a $Q_{PL}$ table where each row of the $Q_{PL}$ table identifies a mobility pattern (e.g. a combination of a location and velocity vector) and corresponding identified link policy. During exploitation, a link policy is referenced in the $Q_{LKR}$ table according to a current mobility pattern and corresponding identified link policy providing an index into the contents of the $Q_{LKR}$ table. The link policy entries can be exploited and applied, if there is match found in the $Q_{PL}$ table with respect to the mobility pattern of the ME. This allows for a rapid BP establishment between the serving MBS, or mBS and the ME, without requiring an exploration phase, where the ME seeks a suitable BP, based on signal detection, measurement, and establishment. The cooperative exploration and exploitation strategy increases the degree of knowledge of radio access network capabilities and availability. Thus enabling the RAN 102 and the ME to continuously improve BP selection to provide seamless connectivity and uninterrupted service experience. Such improved BP selection-making is facilitated by dynamic and cooperative execution of the reinforcement-based learning operations described herein and subsequent exploitation of the resulting CHO tables described herein.

Turning to FIG. 5B, an example is provided of slice policy-related table structures of the CHO tables generated and updated during operation 414 in accordance with a reinforcement-based learning arrangement for providing an E2E network slice policy for a RAN 102 in accordance with the disclosure. The entries within the $Q_{SKR}$ (service, KPI, reward) table are slice policy entries that are accessed (during exploitation of the configured $Q_{SKR}$ table) in accordance with entries of a $Q_{PS}$ table where each row of the $Q_{PS}$ table identifies a slice pattern and corresponding identified slice policy. During exploitation, a slice policy is referenced in the $Q_{SKR}$ table according to a current slice pattern and corresponding identified slice policy providing an index into the contents of the $Q_{SKR}$ table. As such, the reinforcement-based learning arrangement described herein and the resulting $Q_{SKR}$ table facilitate a relatively fast subsequent identification of a slice policy for executing a rapid handover operation that achieves superior performance without requiring an exploration phase during each handover operation. This cooperative exploration and exploitation strategy increases the responsiveness and efficiency of the RAN 102 and the MEs connecting to the RAN 102 for enabling a continuous improvement of seamless connectivity and service experience, through use of dynamic and cooperative reinforcement-based learning to generated and update the $Q_{SKR}$ tables.

Figure 6:
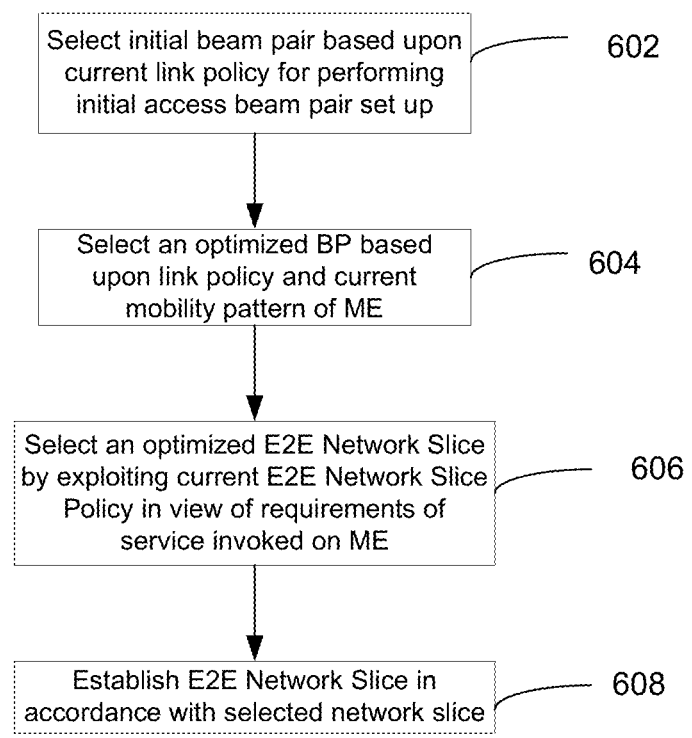
FIG. 6 summarizes an exemplary set of operations for selection of a network slice meeting a criterion for supporting a communication requirements on an end-to-end basis in accordance with the present disclosure.

Turning to FIG. 6, a flow chart summarizes an exemplary reinforcement learning-based operation for performing link policy optimization and slice policy optimization, for updating a link policy and an E2E network slice policy that are thereafter used to perform a fast handover of an ME executing an identified service having an associated KPI profile. The provided flowchart summarizes an overall logic of the reinforcement learning-based algorithm to support establishing a best BP and the best E2E network slice currently available to support a specific service invoked by an ME exhibiting a current mobility pattern.

During 602, the ME establishes an initial BP with a RAN node using an available link policy (not necessarily updated/optimized by q-learning of FIG. 2). The initial BP facilitates communications for establishing an optimized BP based upon system reinforcement learning-based algorithm (q-learning) described herein above. The ME communicates a request to the RAN node including an indication of a desired service level (e.g. KPI profile) for a service invoked on the ME.

During 604 and 606 (not necessarily in the identified order of FIG. 6), the system reinforcement learning-based algorithm is performed to update a link policy of current interest and select a best BP and a best E2E network slice, for a given mobility pattern, using an optimized link policy $P_L$ and an optimized slice policy $P_S$, for a cognitive and fast handover across serving boundaries, leverages autonomic networking principles.

By way of a specific example, a Network Slice Type (NEST), corresponding to the ME-supplied service KPI profile, is applied to a Generic Slice Template (GST) to identify an E2E network slice from an optimized E2E network slice policy. By way of example, the best BP is selected from a set of BPs in accordance with an optimized link policy and characteristics of the currently available beams of ME and RAN node(s). By way of example, the best E2E network slice for supporting the service invoked on the ME is selected from a list of slice patterns provided by the optimized slice policy based upon the KPI profile of the invoked service and capabilities of the provided E2E network slices of the optimized slice policy $P_S$.

Moreover, ability to configure an E2E network slice to suit a specified KPI profile can be leveraged in a diverse and emerging universe of innovative services, within a domain and across different domains, through the use of distributed ledger technology (DLT) enabled smart contracts that render service level agreements automatically across any service roaming agreement that spans multiple domains.

The system information contained in the system information blocks (SIBs) of a serving MBS or mBS can be leveraged to convey the types of available resources, to suit different NESTs, such as bandwidths, roaming information, neighboring base stations, energy efficiency, load conditions, and other configurable parameters to the VME or ME.

A configurable E2E network slice consists of modular microservices for enabling flexible allocation of networking, computing, and storage resources.

Thereafter, during 608, an E2E network slice determined during 604 and 606 (including a BP selected from an optimized link policy), is established to support the service invoked by the ME. Moreover, the resulting performance of the selected BP and E2E network slice may constitute an "exploration" phase of the reinforcement-based learning (q-learning) described herein above with reference to FIG. 2 that facilitates a continuous optimization of both the link policies and E2E network slice policies provided by the NWDAF 104 for fast optimized BP and E2E network slice selection by other MEs having similar mobility pattern and service KPI profiles.

All references, including publications, patent applications, and patents, cited herein are hereby incorporated by reference to the same extent as if each reference was individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to.") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method carried out over a mobile wireless network for performing beam pair (BP) and end-to-end (E2E) network slice selection for supporting an invoked service on a mobile equipment (ME), the method comprising:
establishing an initial BP with a radio access network (RAN) node, using an available link policy, enabling communicating a request to the RAN node including an indication of a desired service level for a service invoked on the ME;
updating, in accordance with the indication of a desired service level, a link policy and an E2E network slice policy by performing a reinforcement learning, wherein the link policy is used to select a BP for the ME for a given ME mobility pattern, and wherein the E2E network slice policy is used to select an E2E network slice for the desired service level for the service invoked on the ME; and
selecting an E2E network slice including a target BP selected according to the link policy, to support the service invoked by the ME.

2. The method of claim 1, wherein the indication of a desired service level comprises a key performance indicator (KPI) profile.

3. The method of claim 1, wherein during the reinforcement learning, an action is specified to an environment by an agent, wherein the action proposes a changes to at least one of the group consisting of:
a previously proposed link policy; and
a previously proposed E2E network slice policy.

4. The method of claim 1, further comprising providing the link policy to the RAN node.

5. The method of claim 1, wherein during the updating, an exit criterion is specified for terminating performing the reinforcement learning.

6. The method of claim 5, wherein the exit criterion comprises a quantity corresponding to a maximum number of episodes of an action/next state and reward specification cycle of the reinforcement learning.

7. The method of claim 1, wherein the link policy is specified in a link policy table including entries identifying distinct mobility patterns of the ME and corresponding link performance indicator reward values.

8. The method of claim 7 wherein each distinct mobility pattern is specified by a geospatial location and velocity combination.

9. The method of claim 1, wherein the E2E network slice policy is specified in a link policy table including entries identifying distinct E2E network slice patterns and corresponding service performance indicator reward values.

10. The method of claim 9, wherein each distinct E2E network slice pattern is specified by a slice resource.

11. A networked system comprising:
a processor; and
a non-transitory computer-readable medium including computer-executable instructions that, when executed by the processor, facilitate carrying out a method carried out over a mobile wireless network for performing beam pair (BP) and end-to-end (E2E) network slice selection for supporting an invoked service on a mobile equipment (ME), the method comprising:
establishing an initial BP with a radio access network (RAN) node, using an available link policy, enabling communicating a request to the RAN node including an indication of a desired service level for a service invoked on the ME;
updating, in accordance with the indication of a desired service level, a link policy and an E2E network slice policy by performing a reinforcement learning, wherein the link policy is used to select a BP for the ME for a given ME mobility pattern, and wherein the E2E network slice policy is used to select an E2E network slice for the desired service level for the service invoked on the ME; and
selecting an E2E network slice including a target BP selected according to the link policy, to support the service invoked by the ME.

12. The system of claim 11, wherein the indication of a desired service level comprises a key performance indicator (KPI) profile.

13. The system of claim 11, wherein during the reinforcement learning, an action is specified to an environment by an agent, wherein the action proposes a changes to at least one of the group consisting of:
a previously proposed link policy; and
a previously proposed E2E network slice policy.

14. The system of claim 11, further comprising providing the link policy to the RAN node.

15. The system of claim 11, wherein during the updating, an exit criterion is specified for terminating performing the reinforcement learning.

16. The system of claim 15, wherein the exit criterion comprises a quantity corresponding to a maximum number of episodes of an action/next state and reward specification cycle of the reinforcement learning.

17. The system of claim 11, wherein the link policy is specified in a link policy table including entries identifying distinct mobility patterns of the ME and corresponding link performance indicator reward values.

18. The system of claim 17 wherein each distinct mobility pattern is specified by a geospatial location and velocity combination.

19. The system of claim 11, wherein the E2E network slice policy is specified in a link policy table including entries identifying distinct E2E network slice patterns and corresponding service performance indicator reward values.

20. The system of claim 19, wherein each distinct E2E network slice pattern is specified by a slice resource.

* * * * *